Nov. 1, 1932.  J. J. BOLAND  1,885,222

LUBRICATING SYSTEM

Filed June 10, 1929

INVENTOR.
Joseph J. Boland
BY
ATTORNEY.

Patented Nov. 1, 1932

1,885,222

UNITED STATES PATENT OFFICE

JOSEPH J. BOLAND, OF KEYPORT, NEW JERSEY, ASSIGNOR, BY MESNE ASSIGNMENTS, TO AEROMARINE PLANE & MOTOR COMPANY, INC., OF KEYPORT, NEW JERSEY, A CORPORATION OF NEW YORK

LUBRICATING SYSTEM

Application filed June 10, 1929. Serial No. 369,857.

This invention relates to lubricating systems and more particularly to a means adapted to lubricate the rocker-arms of an internal combustion engine.

It is generally conceded that it is a difficult problem to maintain the rocker-arms of an engine sufficiently lubricated especially during long runs, and when such engines constitute the power plant of an airplane it is either impossible or extremely hazardous to attempt to lubricate them during the operation of the engine by the method commonly employed.

With the means herein proposed, it will be found practicable to keep the rocker-arms adequately lubricated over long periods, and when additional lubrication is thought necessary, one simple operation will suffice to add additional lubricant simultaneously to a multiplicity of rocker-arms.

An object of the invention is to provide a suitable means attachable to most engines with only slight modifications, by which a plurality of rocker-arms or other oscillating parts may be simultaneously lubricated by a single operation as by injection from a grease-gun.

A further object of the invention is to provide a mechanism for the purpose set forth in which the construction is such as to permit the lubrication of a rocker-arm system or the like from a convenient or readily accessible position and without the removal of the usual cover or housing which encloses such a structure.

Various other objects and advantages of the invention will be in part apparent from an inspection of the accompanying drawing and a careful consideration of the following particular description and claims of one form of mechanism embodying my invention.

Figure 1:
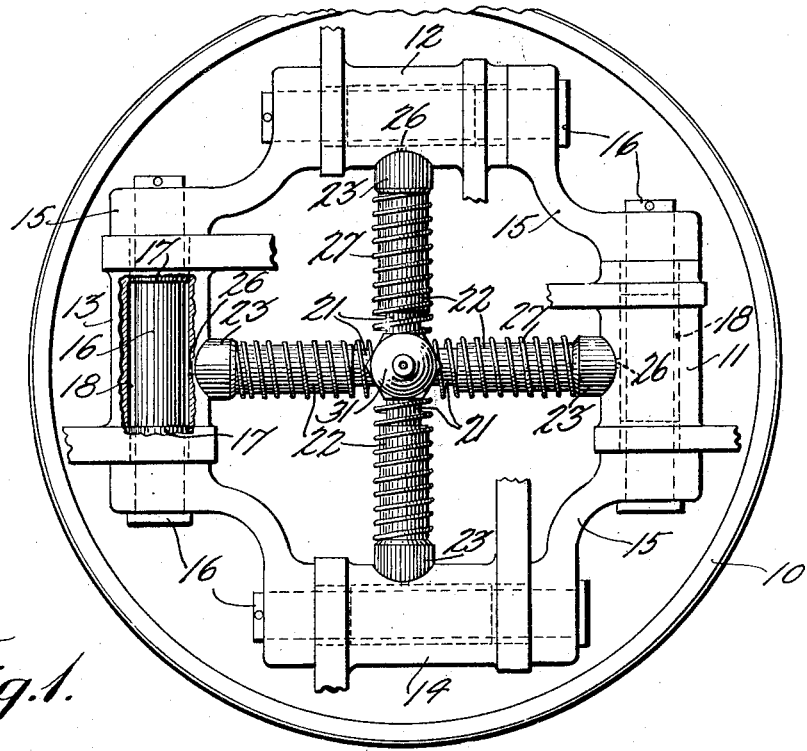
Figure 1 is a plan view of a cylinder head with the usual cover removed so as to disclose the present invention as operatively attached to the conventional rocker-arm structure.
Figure 2:
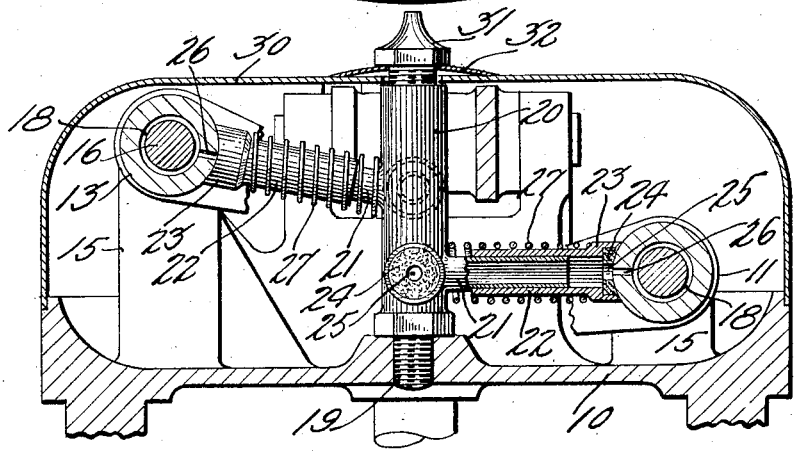
Figure 2 is a side view of the parts illustrated in Fig. 1 the same being shown partly in section with the cover attached.

With reference to the drawing, 10 designates a portion of the cylinder head of an engine on which are mounted the usual rocker-arms 11, 12, 13, and 14; said rocker-arms being operatively supported in the brackets 15 by means of the pins 16 which provide the journals. It is considered preferable to provide the rocker-arms with bushings 17 so as to form a suitable space or clearance 18 around the pins 16 for the retention of a quantity of lubricant adjacent the bearing portions of the rocker-arms.

Centrally disposed between these rocker-arms I have secured to the cylinder head in any suitable manner as by the screw-threads 19, a tubular member 20 provided with tubular limbs or branches 21. On these branch members there are telescopically mounted the tubes 22 which are provided with an enlarged end portion 23 so formed as to fit the cylindrical portion of the rockers as shown. Into these end portions 23 a felt ped 24 has been inserted which is provided with a centrally disposed passage 25 adapted to register with an orifice 26 formed in the rockers, and a spring 27 resiliently maintains the ends of the tubes 22 with their associated felt pads up against the cylindrical portion of the rockers.

Into the upper end of the member 10 and through an opening in the cover 30 there is screw-threaded any suitable type of grease-gun connection 31 which in conjunction with the spring washer 32 maintains the cover 30 in its proper position on the cylinder head.

It will be readily understood that lubrication of all the rocker-arms will be simultaneously effected by the simple application of a grease-gun to the connection 31 and forcibly filling all the passages with a suitable lubricant which will be extruded through the passages 25 in the felt pads to the bearings of the rocker-arms.

It might be mentioned in passing, that the oscillating movement of the rockers is not sufficiently great to move the two openings 25 and 26 out of register providing the one in the felt pads is somewhat larger than the one in the rocker.

It is obvious that the invention as shown is applicable to other forms of oscillating mechanisms and its use in conjunction with such is considered to be within the scope of the invention.

Variations may be resorted to within the scope of the invention and portions of the improvements may be used without the others, whilst not departing from the spirit of the invention.

Having thus described my invention, I claim:

1. In a lubricating device, the combination with a rotatable member having an orifice for the introduction of a lubricant of a hollow member having laterally extending branches of tubular formation rigid therewith, and an element telescopically mounted on each of said branches; each of said elements being adapted to yieldingly engage a rotatable member at the orifice for the purpose of conveying a lubricant thereto from said hollow member.

2. The combination with a cylinder head having a plurality of rocker-arms mounted thereon for oscillation, of a hollow member secured to said cylinder head intermediate said rocker-arms, a plurality of tubular branch members extending laterally therefrom and rigid therewith, an axially slidable extension for each of said branch members, and means adapted to effect a yielding engagement of said extensions with said rocker-arms for the purpose of conveying a lubricant thereto during rocking movement.

3. In a lubricating mechanism, the combination with a rotatable bearing member, of a hollow member adapted to receive and retain a lubricant and provided with tubular branch members rigid therewith, an element telescopically mounted on each of said branches; said elements having an enlarged end portion adapted to fit said bearing member, and means to resiliently hold said end portion against said bearing.

4. In a lubricating mechanism, the combination with an engine having rocker-arms provided with an orifice for the entrance of a lubricant, of a vertically disposed hollow member adapted to receive and retain a lubricant, a plurality of laterally extending branch members rigid therewith, an element telescopically mounted on each of said branches; said elements having an enlarged end portion adapted to fit said rocker-arms and to cover said orifice, and yielding means adapted to enforce contact of said end portions with the rocker-arms during the operation of the engine.

5. In a lubricating mechanism, the combination with an engine having rocker-arms and a cover for said rocker-arms, of a hollow member disposed beneath said cover and adapted to receive and retain a lubricant, said member being provided with tubular branches rigid therewith, an element telescopically mounted on each of said branches, said elements having an enlarged end portion adapted to fit said rocker-arms, a resilient pad in each end portion having an axial passage for the lubricant and adapted to make contact with the rocker-arms, a yielding means adapted to enforce said contact, and a grease-gun valve connection accessible from the exterior of said cover and extending therethrough into said hollow member.

6. In apparatus of the class described, the combination with a means rotatably mounted in bearings and having an orifice for the introduction of a lubricant, of a relatively fixed hollow member adapted to receive and retain a lubricant, a tubular conductor extending from said hollow member, and a further conducting means mounted in connection with said tubular conductor and adapted to be yieldingly pressed into contact with the first said means at said orifice.

Signed at Keyport, in the county of Monmouth, and State of New Jersey this 8th day of June 1929.

JOSEPH J. BOLAND.